United States Patent
Thet et al.

(10) Patent No.: US 9,982,555 B2
(45) Date of Patent: May 29, 2018

(54) GAS TURBINE POWER GENERATION SYSTEM

(71) Applicant: Hitachi, Ltd., Chiyoda-ku, Tokyo (JP)

(72) Inventors: Aung Ko Thet, Tokyo (JP); Noriaki Hino, Tokyo (JP); Naohiro Kusumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 34 days.

(21) Appl. No.: 15/116,706

(22) PCT Filed: Mar. 14, 2014

(86) PCT No.: PCT/JP2014/057951
§ 371 (c)(1),
(2) Date: Aug. 4, 2016

(87) PCT Pub. No.: WO2015/136719
PCT Pub. Date: Sep. 17, 2015

(65) Prior Publication Data
US 2016/0356171 A1    Dec. 8, 2016

(51) Int. Cl.
*F01D 15/00* (2006.01)
*F01D 15/10* (2006.01)
(Continued)

(52) U.S. Cl.
CPC .............. *F01D 15/10* (2013.01); *F01D 5/02* (2013.01); *F02C 3/10* (2013.01); *F02C 6/14* (2013.01);
(Continued)

(58) Field of Classification Search
CPC .... F01D 15/10; F02C 3/10; F02C 6/14; F05D 2220/76; F05D 2270/06
(Continued)

(56) References Cited

U.S. PATENT DOCUMENTS 8,164,208 B2 *  4/2012  Rosson .................. F01D 15/10
                                                        290/4 A
8,584,464 B2 * 11/2013  Joshi ........................ F02C 3/10
                                                          60/726

(Continued)

FOREIGN PATENT DOCUMENTS

| EP | 2 241 725 A2 | 10/2010 |
| WO | WO 2004/018855 A1 | 3/2004 |
| WO | WO 2014/020772 A1 | 2/2014 |

OTHER PUBLICATIONS

International Search Report (PCT/ISA/210) issued in PCT Application No. PCT/JP2014/057951 dated Jan. 19, 2015 (three (3) pages).

*Primary Examiner* — Julio C. Gonzalez
(74) *Attorney, Agent, or Firm* — Crowell & Moring LLP

(57) ABSTRACT

A gas turbine power generation system has a dual-shaft gas turbine, an electric generator mechanically connected to a low pressure turbine of the dual-shaft gas turbine and electrically connected to an electric power system, a rotary electric machine mechanically connected to a high pressure turbine through a compressor of the dual-shaft gas turbine and electrically connected to the electric power system, and an electric power output from the electric generator side to the electric power system is adjusted by operation of the rotary electric machine as a motor or as a generator.

13 Claims, 6 Drawing Sheets

(51) Int. Cl.
*F02C 3/10* (2006.01)
*F02C 6/14* (2006.01)
*F01D 5/02* (2006.01)
*H02K 7/18* (2006.01)

(52) U.S. Cl.
CPC ....... *H02K 7/1823* (2013.01); *F05D 2220/32* (2013.01); *F05D 2220/76* (2013.01); *F05D 2240/60* (2013.01); *F05D 2270/06* (2013.01)

(58) Field of Classification Search
USPC .............................. 290/52; 60/772, 773, 659
See application file for complete search history.

(56) References Cited

U.S. PATENT DOCUMENTS

| | | | |
|---|---|---|---|
| 2005/0056021 A1* | 3/2005 | Belokon | F02C 3/113 60/772 |
| 2006/0150633 A1* | 7/2006 | McGinley | F02C 7/275 60/773 |
| 2009/0320438 A1* | 12/2009 | Koganezawa | F02C 3/10 60/39.15 |
| 2010/0031667 A1* | 2/2010 | Hoffmann | F01D 15/10 60/773 |
| 2012/0017600 A1* | 1/2012 | Saito | F02C 9/263 60/773 |
| 2012/0104842 A1 | 5/2012 | Moore et al. | |
| 2014/0216047 A1* | 8/2014 | Morisaki | F01D 5/06 60/774 |
| 2015/0171705 A1 | 6/2015 | Hino et al. | |
| 2017/0159577 A1* | 6/2017 | Hino | F02C 9/54 |

\* cited by examiner

GAS TURBINE POWER GENERATION SYSTEM

TECHNICAL FIELD

The present invention relates to a gas turbine power generation system contributing stability of electric power system.

BACKGROUND ART

Nowadays, integration of electricity generation from renewable energy resources into power systems is increasing. As the renewable energy resources have uncertainty nature, the electricity generation from the renewable energy resources has the characteristics of output power fluctuation which causes impacts on voltage stability and frequency stability of the power systems.

In order to mitigate the impact of output power fluctuation, conventional generators in power systems become to have a fast load-following capability. In addition to a conventional pump-water storage hydro generator, a high-speed turbine generator such as a gas turbine generator, a steam turbine generator, can satisfy for the fast load-following capability. Due to affordable initial cost and low emissions of green house gas, the gas turbine generator can be considered as one of the best generator systems to smooth the fluctuation. However, the gas turbine may suffer stress if they are operated to response the fast fluctuation.

A prior art in this technical field is disclosed by US2012/0104842A1. This publication describes that the use of an auxiliary power source to reduce or substantially prevent the buildup of torque oscillations in the mechanical drive train in an aero gas turbine while providing electrical power to meet changes in an electrical condition of an isolated electrical network.

This prior art is only suitable for the isolated electrical network as terminal voltage cannot be kept at fixed level. Moreover, this prior art still requires an external electrical network to transport the electrical power and does not increase a capability of reactive power and active power.

Thus, there is a need for the auxiliary power source to increase the capability of reactive power and improve active power response of gas turbine generator in electric power systems where improvement of voltage and frequency stability is required.

CITATION LIST

Patent Literature

Patent Literature 1: US2012/0104842A1

SUMMARY OF INVENTION

Technical Problem

In order to contribute the voltage and frequency stability of electric power systems by a gas turbine generator, an automatic voltage regulator (AVR) of the generator has limits of a reactive power capability and the gas turbine has mechanical delay to output the fast response of active power.

Accordingly, it is an object of the present invention to provide a gas turbine power generation system with an increased power capability and an improved power response for stability of a power system.

Solution to Problem

In order to solve the above mentioned problem, a gas turbine power generation system according to the present invention has a dual-shaft gas turbine, an electric generator mechanically connected to a low pressure turbine of the dual-shaft gas turbine and electrically connected to an electric power system, a rotary electric machine mechanically connected to a high pressure turbine through a compressor of the dual-shaft gas turbine and electrically connected to the electric power system, and an electric power output from the electric generator side to the electric power system is adjusted by operation of the rotary electric machine as a motor or as a generator.

Advantageous Effects of Invention

A gas turbine power generation system according to the present invention results an increased power capability and a fast response to adjust electric power. Therefore, stability of a power system is improved.

Other objects, features and advantages of the invention will appear from the following description with the accompanying drawings.

DESCRIPTION OF EMBODIMENTS

Preferred embodiments of the present invention directing to a gas turbine power generation system will be described.

EXAMPLE 1

Figure 1:
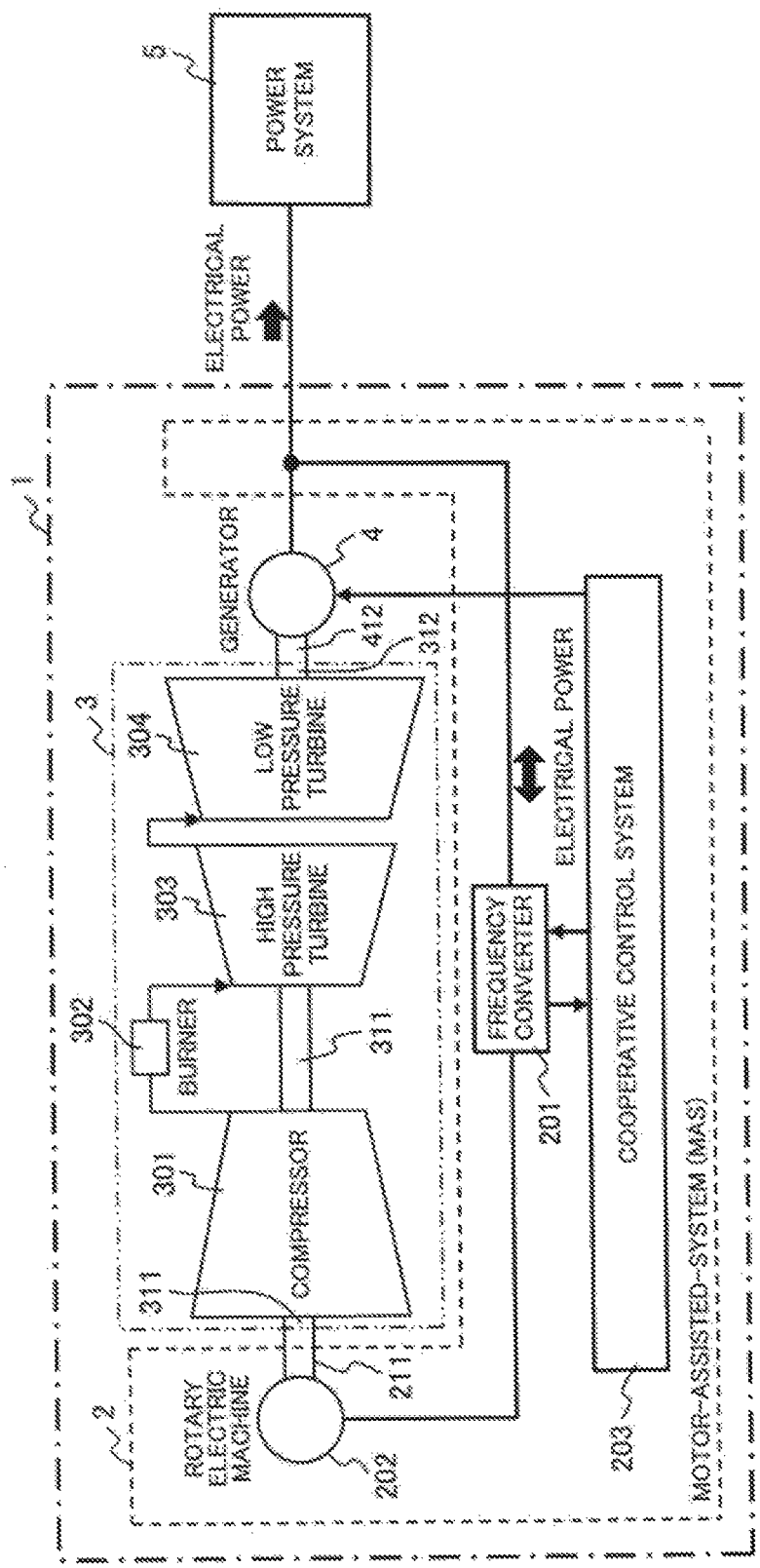
FIG. 1 illustrates an outline of a gas turbine power generation system.

FIG. 1 illustrates an outline of a gas turbine power generation system.

The gas turbine power generation system [1] has a motor-assisted system (MAS) [2] to adjust an electric power for a power system [5] by a rotary electric machine [202] consuming or generating an electric power, a dual-shaft gas turbine [3] and a generator [4], which outputs an electric power to the power system [5], rotating by the dual-shaft gas turbine [3].

The dual-shaft gas turbine [3] has a compressor [301], a burner [302] to make a high-temperature and high-pressure gas with burning a fuel mixing with an air compressed by the compressor [301], a high pressure turbine [303] rotating by the high-temperature and high-pressure gas, a first rotating shaft [311] connecting mechanically the high pressure turbine [303] to the compressor [301] and a low pressure turbine [304], which has a second rotating shaft [312]

coupling with a rotating shaft [412] of the generator [4], rotating at a speed for frequency of the power system [5] by a gas discharged from the high pressure turbine [301].

This gas turbine power generation system [1] is connected electrically to the power system [5] to supply an electrical power for the power system [5]. The electrical power is supplied mainly by the generator [4]. Additionally, the electrical power is adjusted partly by the motor-assisted system [2]. The motor-assisted system [2] includes the rotary electric machine [202] of which a rotating shaft [211] couples with the first rotating shaft [311], a frequency converter [201], which is connected electrically between the rotary electric machine [202] and an electrical output of the generator [4], to operate the rotary electric machine [202] as a variable-speed motor or a generator, and a cooperative control system controlling the frequency converter [202]. Any kind of AC rotary electric machines such as a synchronous machine and an induction machine are applied to the rotary electric machine [202].

An electrical energy can be transformed into a mechanical energy and this mechanical energy can be transported to the compressor [301] in the dual-shaft gas turbine [3], when the rotary electric machine [202] operates as the variable-speed motor by the frequency converter [201]. On the other hand, the mechanical energy from the compressor [301] can be transformed into the electrical energy and this electrical energy can be transported to the power system [5], when the rotary electric machine [202] operates as the generator by the frequency converter [201]. These operations of the motor-assisted system [2] including the rotary electric machine [202] adjust the electric power for the power system [5] so as to increase a reactive power capability of gas turbine power generation system and to improve an active power response of it for voltage and frequency stability of power system, as described in detail later.

Figure 2:
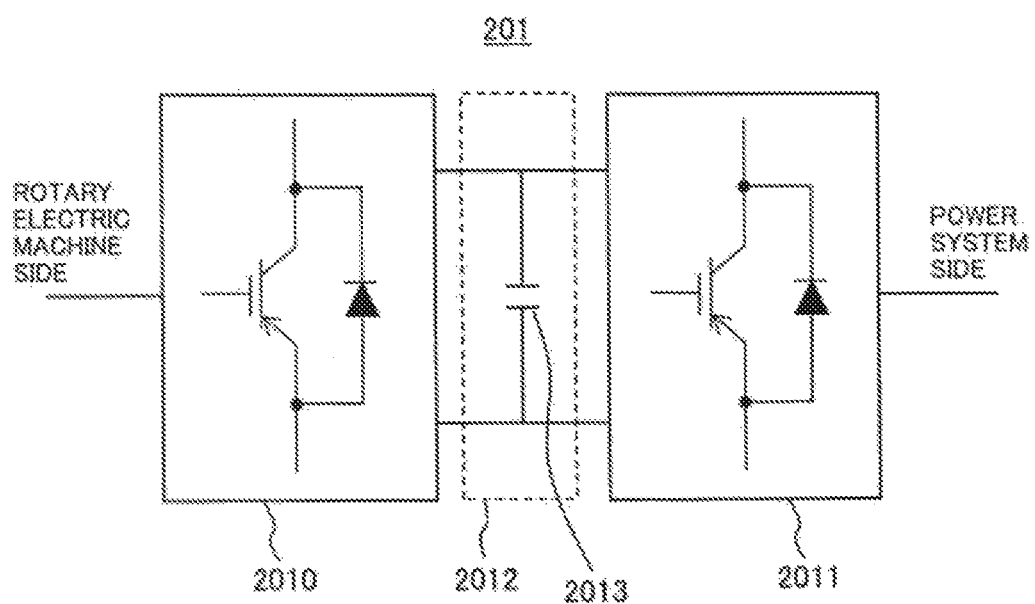
FIG. 2 illustrates an example of a circuit configuration of a frequency converter.

FIG. 2 illustrates an example of a circuit configuration of the frequency converter [201] in FIG. 1. The frequency converter [201] is so-called "BTB (back to back)". One of power conversion circuits [2010, 2011] such as three-phase bridge circuits is connected in series to the other of them through a DC link circuit [2012] having a smoothing capacitor [2013].

When the rotary electric machine [202] operates as a variable-speed motor, the power conversion circuit [2010] on the rotary electric machine side operates as an inverter converting a DC power of the DC link circuit [2012] to an AC power supplied to the rotary electric machine [202], and the power conversion circuit [2011] on the power system side operates as a converter converting an AC power of the power system [5] to the DC power of the DC link circuit [2012]. When the rotary electric machine [202] operate as a generator, the power conversion circuit [2010] on the rotary electric machine side operates as an converter converting an AC power generated by the rotary electric machine [202] to a DC power of the DC link circuit, and the power conversion circuit [2011] on the power system side operates as an inverter converting the DC power of the DC link circuit [2013] to an AC power supplied to the power system [5].

Additionally, power semiconductor devices such as IGBTs in the power conversion circuits [2010, 2011] are controlled with PWM (Pulse Width Modulation). Consequently, the rotary electric machine [202] can operate as a variable speed motor and can operate as a generator supplying an electric power on a frequency of the power system [5] to the power system. In this manner, the motor-assisted system [2] can adjust the electric power for the power system [5] by the rotary electric machine [202] consuming or generating an electric power.

Figure 3:
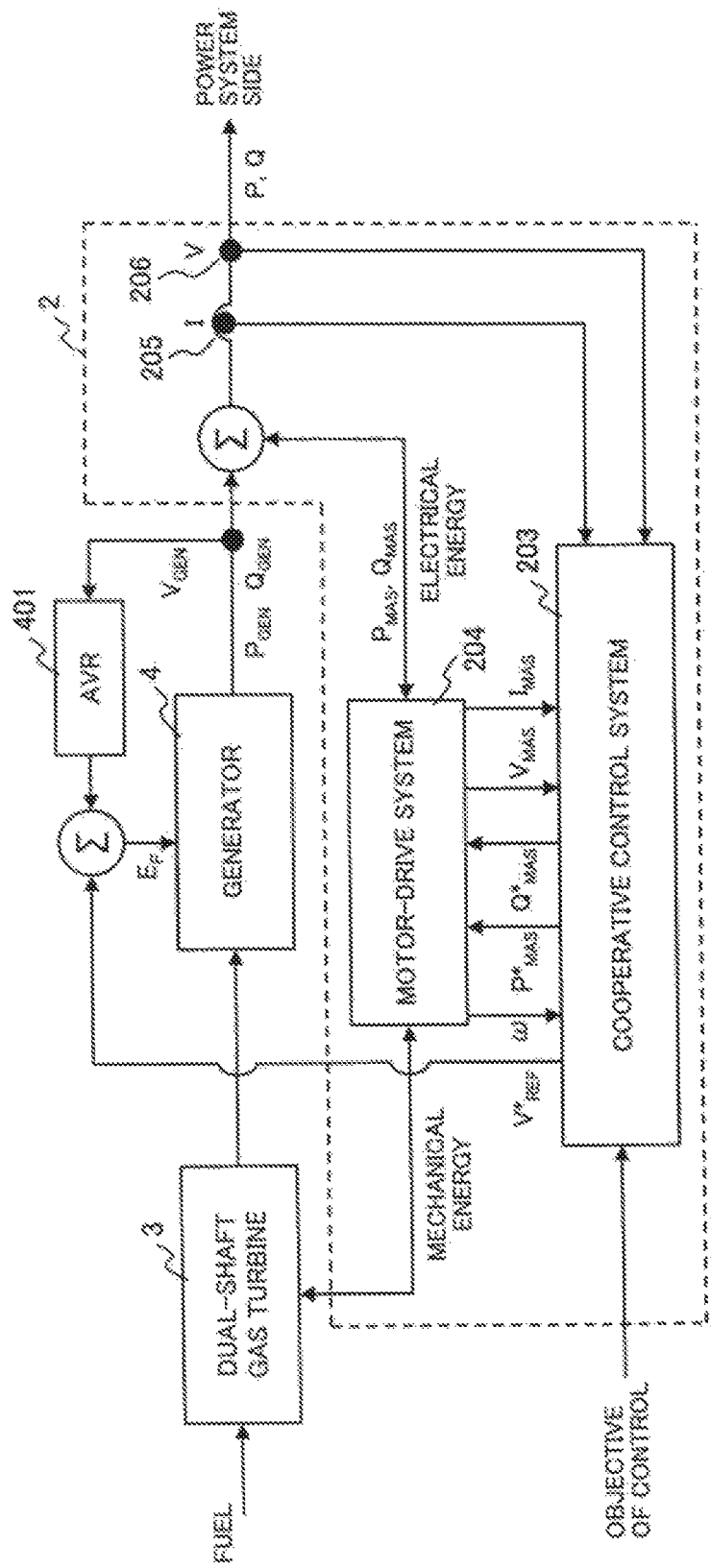
FIG. 3 illustrates a block diagram of the gas turbine power generation system.

FIG. 3 illustrates a block diagram of the gas turbine power generation system [1]. The dual-shaft gas turbine [3] converts a heat energy of high-temperature and high-pressure gas generated with burning a fuel to a mechanical energy for driving the generator [4]. The generator [4] converts the mechanical energy from the dual-shaft gas turbine to an electric power consist of an active power ($P_{GEN}$) and a reactive power ($Q_{GEN}$). An automatic voltage regulator AVR [401] controls an output voltage $V_{GEN}$ of the generator [4].

In this embodiment, the AVR [401] output excitation voltage for control of $V_{GEN}$ so as to bring a difference between a pre-determined voltage and a value of $V_{GEN}$ detected by a voltage sensor [403] close to zero. Reference voltage $V^*_{REF}$ for a correction of the excitation voltage output by the AVR [401] is calculated by a cooperative control system [203] on the basis of an objective, an active power P* and a reactive power Q* output by the gas turbine power generation system [1] for a stability of the power system [5] under an electrical fluctuation in the power system [5].

An adjustment of the reactive power of the generator [4] with a control of excitation voltage $E_F$ generated with correction of the excitation voltage from the AVR [401] by the reference voltage $V^*_{REF}$ is not enough for the stability of the power system, as follows.

For voltage stability improvement, it is a point to consider the reactive power capability limits of a generator. A Generator is rated in terms of maximum active power output (MVA) at a specified voltage and power factor (usually 0.85 or 0.9 lagging) which they can carry continuously without overheating. The continuous reactive power output (MVar) capability is limited by three considerations: armature current limit, field current limit, and end region heating limit.

The armature current results in an $I^2R$ power loss, and the energy associated with this loss is removed so as to limit the increase in temperature of the conductor and its immediate environment. Therefore, one of the limitations on generator rating is the maximum current that can be carried by the armature without exceeding the heating limitation. Therefore, in the active power and reactive power (PQ) plane, the armature current limit appears as a circle with center at the region and radius equal to the MVA rating.

Because of the heating from the power loss in generator's field current, a second limitation on the operation of a generator is the field current.

End region heating imposes a third limit on the operation of a generator. This limit affects the capability of the machine in the under-excited condition. At armature, the end-turn leakage flux enters and leaves in a direction perpendicular to the stator laminations, which causes eddy current in the laminations, resulting in localized heating in the end region. In the under-excited condition, the field current is low. This permits an increase in armature end-turn leakage flux and resulting heating effect and imposing the limitation on generator.

Generally, with balanced design, the thermal limits for the field and armature intersect at a point that represents generator MVA rating and power factor rating.

An automatic voltage regulator (AVR) of generator is used to control generator terminal voltage by adjusting excitation voltage of a generator so as to control reactive power. Therefore, a control system design of AVR meets the above mentioned limitations.

For frequency stability improvement, it is a point to consider an active power capability limit of a generator.

Active power output is limited by a prime mover capability to transform mechanical energy within the MVA rating. Existence of dead time characteristic in a speed changer of governor and turbine limits an instantaneous response to output active power to smoothen fluctuation in a power system.

The above limits on reactive and active power output are imposed by capabilities of a machine itself and are determined by a design of the machine.

In order to contribute the voltage and frequency stability improvement by gas turbine generation, AVR control has limits according to reactive power capability and prime mover has delay to get an instantaneous response for active power output.

To overcome the above mentioned limitations, the motor-assisted system (MAS) [2] is applied in this embodiment.

In FIG. 3, a motor-drive system [204] in the MAS [2] includes the rotary electric machine [202] and the frequency converter [201] shown in FIG. 1. The frequency converter [201] in the motor drive system [204] has a capability to control a reactive power $Q_{MAS}$ and an active power $P_{MAS}$ of the MAS [2] on the power system [5] side, independently, with using active power reference $P^*_{MAS}$ and reactive power reference $Q^*_{MAS}$ output by the cooperative control system [203]. The cooperative control system [203] calculates these references $P^*_{MAS}$, $Q^*_{MAS}$ for the frequency converter [201] and the reference voltage $V^*_{REF}$ for the AVR [401] based on a current I detected by a current sensor [205] and a voltage V detected by a voltage sensor [206] at an output of the gas turbine power generation system [1], a voltage $V_{MAS}$ and a current $I_{MAS}$ of the MAS [2] on the power system [5] side, a speed w of the rotary electric machine [202] detected by a position sensor coupled to the rotating shaft [412] of the generator [4] such as a rotary encoder, and the objectives in order to make quick power supply from the MAS [2] in addition to an output power of the generator [4].

According to the afore-mentioned manner, the motor-drive system [204] exchanges the power between the electric power system [5] and the high pressure turbine (HPT) in the dual-shaft gas turbine [3]. Therefore, auxiliary energy flow can be controlled by operation of the rotary electric machine [202] in the motor-assisted system (MAS), between output of the generator [4] and HPT. As the compressor at HPT can be operated in allowable variable speed range, the kinetic energy can be stored in inertia of the compressor [301] and the fast response of active power adjustment is done by means of active power control in MAS.

Moreover, the frequency converter [201] of the MAS [2] is controlled by the cooperative control system [203] that controls the AVR [401] of generator and power of frequency converter [201] in motor-drive system [204] to adjust the active and reactive power output of gas turbine power generation system [1]. This cooperative control system [203] determines the reactive power adjustment of AVR, active and reactive power output of frequency converter by considering the power factors of the generator [4] and the MAS [2].

A constant power factor operation mode in the gas turbine power generation system [1] is explained with FIG. 4, as follows.

Figure 4:
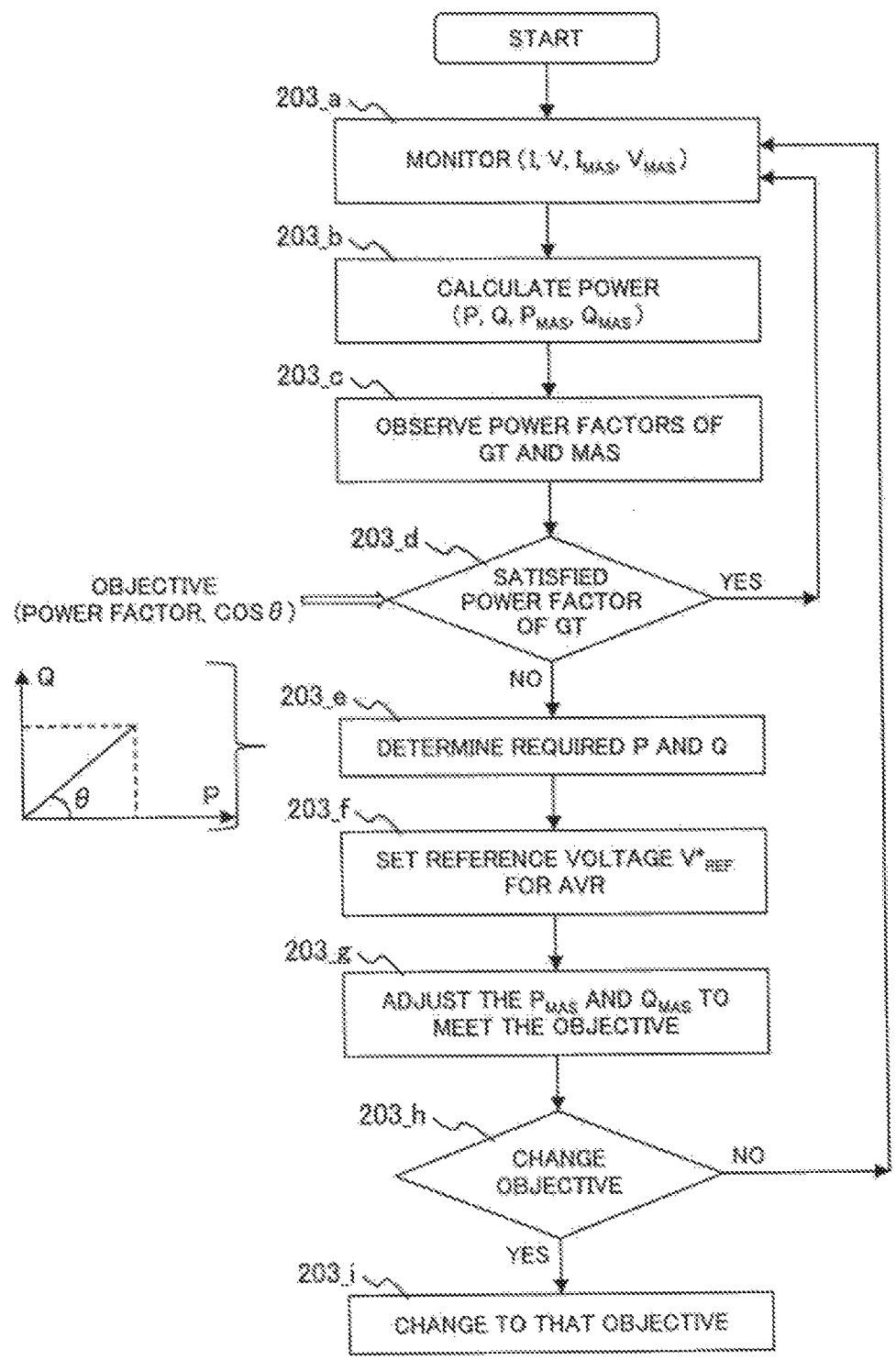
FIG. 4 illustrates a flowchart showing processes of a cooperative control system in a constant power factor operation mode.

FIG. 4 illustrates a flowchart showing processes of the cooperative control system [203] in the constant power factor operation mode.

In FIG. 4, the cooperative control system [203] has an objective to keep the power factor of the gas turbine power generation system [1] at constant. In this operation, voltage (V) and current (I) of the gas turbine power generation system [1] are monitored, and voltage ($V_{MAS}$) and current ($I_{MAS}$) of the motor-assisted system [2] are monitored [203_a]. Then, active power (P) and reactive power (Q) of the gas turbine power generation system [1] (GT) are calculated on the basis of V and I, and active power ($P_{MAS}$) and reactive power ($Q_{MAS}$) of the motor assisted system [2] (MAS) are calculated on the basis of $V_{MAS}$ and $I_{MAS}$ [203_b]. Then power factors cos(θ), where θ is an angle between voltage and current, of the gas turbine power generation system [1] (GT) and the motor-assisted system [2] (MAS) are observed on the basis of (V, I, $V_{MAS}$, $I_{MAS}$) or (P, Q, $P_{MAS}$, $Q_{MAS}$) [203_c].

After observing the power factors, it is checked whether the observed power factor of the gas turbine power generation system [1] meets the objective of that or not [203_d]. If the observed power factor meets the objective of power factor, then the cooperative controller [203] keeps continue to monitor the voltage and current of the GT [1] and the MAS [2][203_a]. If the observed power factor of the GT does not meet, a required active power and a required reactive power are determined under the objective of power factor of the GT with using means of index k represented by [MATH 1] [203_e].

$$k=\Delta Q/\Delta P \qquad \text{[MATH 1]}$$

The index k is a pre-determined function of the objective of power factor of the GT [1]. ΔP is a difference between the required P and the observed P, and ΔQ is a difference between the required Q and the observed Q.

Reference voltage $V^*_{REF}$ for the AVR [401] is set by the cooperative control system [203] on the basis of the objective of power factor of the GT [1] [203_f]. The reactive power from the generator [4] $Q_{GEN}$ is brought close to the required reactive power by the excitation voltage $E_F$ based on the excitation voltage output by the AVR [401] and $V^*_{REF}$. Consequently, the generator [4] outputs the $P_{GEN}$ and the $Q_{GEN}$ within acceptable range in capability of the generator [4] near the required P and Q under the objective of power factor.

Control of an automatic voltage regulator (AVR) [401] is considered as dominant in adjustment of power of the GT [1] because of $|P_{GEN}|>|P_{MAS}|$ and $|Q_{GEN}|>|Q_{MAS}|$. However, the adjustment may be not enough for the required P and Q of the GT [1]. Therefore, active power $P_{MAS}$ and reactive power $Q_{MAS}$ of the frequency converter [201] in the motor drive system [204] at the power system [5] side are adjusted to reference active power $P^*_{MAS}$ and reference reactive power $Q^*_{MAS}$ respectively [203_g].

The reference active power $P^*_{MAS}$ and the reference reactive power $Q^*_{MAS}$ are calculated by the cooperative control system [203] under the objective of power factor. In this calculation, the difference between the required P and the $P_{GEN}$ controlled by an excitation is added to the observed $P_{MAS}$ to find the $P^*_{MAS}$, and the difference between the required Q and the $Q_{GEN}$ controlled by the excitation is added to the observed $Q_{MAS}$ to find the $Q^*_{MAS}$ on the basis of voltage $V_{MAS}$ detected by a voltage sensor provided at the power system [5] side of the frequency converter [203] and current $I_{MAS}$ detected by a current sensor provided at the side of that, in consideration of the observed power factor of the MAS [2].

As the response of power control by the frequency converter [201] in the MAS [2] is faster than the excitation control, and extra active and reactive power adjustment is available, power adjustment of the active power $P_{MAS}$ and the reactive power $Q_{MAS}$ is carried out until to meet the objective [203_g]. By this way, with the assistance of power adjustment by the MAS [2], the power factor can be reached stability and can be reached the objective even though there is a limit to the control of the excitation.

The objective of cooperative control system is checked again in [203_h]. If the objective is not changed, the control for constant power factor operation is continued with return of the flow to [203_a]. If the objective is changed, then the cooperative control system changes to that objective [203_i].

With this example 1, the gas turbine power generation system can provide additional active and reactive power via the MAS while keeping the limits of main generator. Moreover, the capability of reactive power and response of active and reactive power are improved. Therefore, the gas turbine power generation system can contribute the power factor stability improvement in the power system.

EXAMPLE 2

Figure 5:
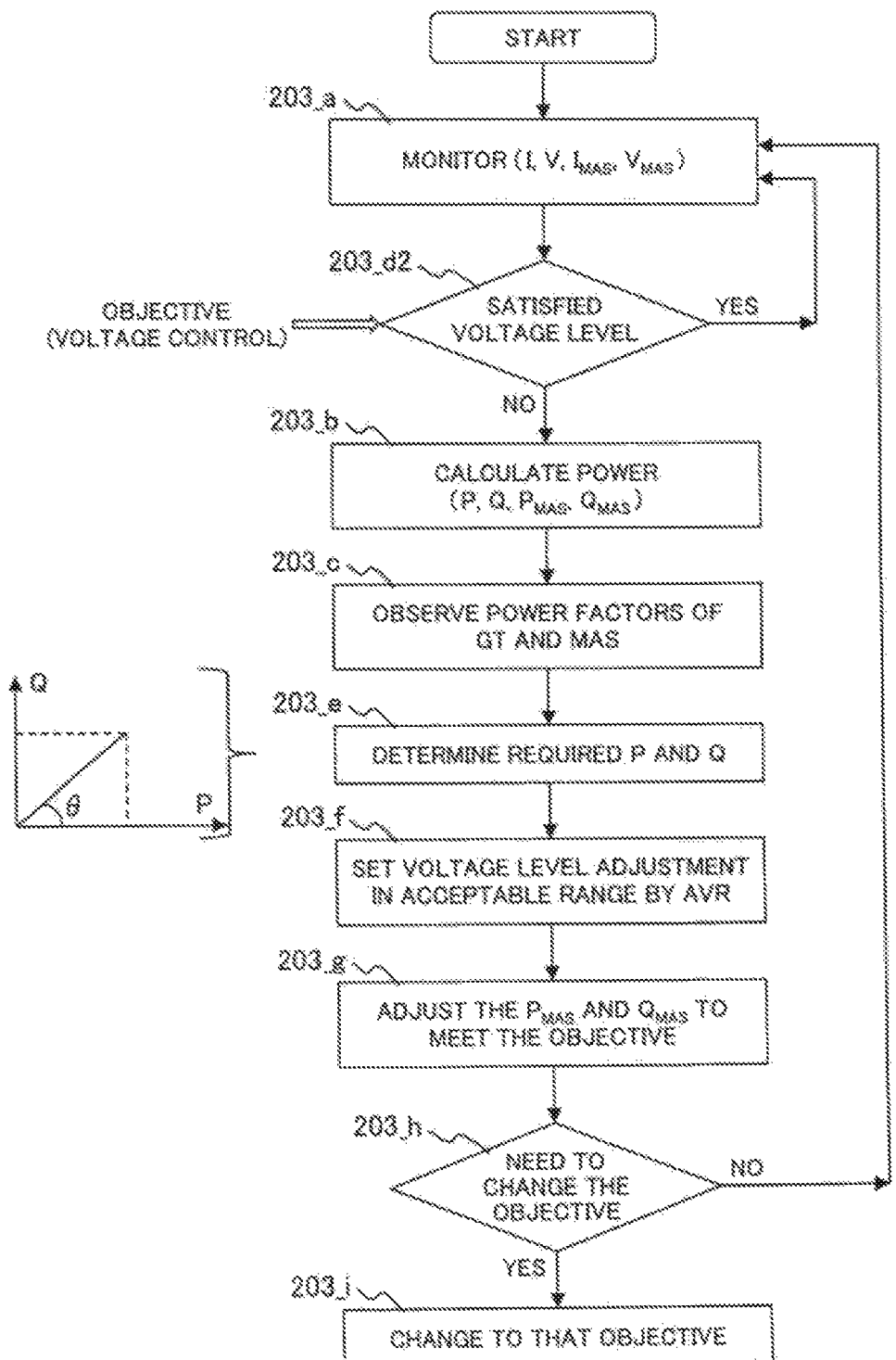
FIG. 5 illustrates a flowchart showing processes of the cooperative control system in a voltage stabilization operation mode.

A voltage stabilization operation mode in the gas turbine power generation system [1] is explained with FIG. 5.

FIG. 5 illustrates a flowchart showing processes of the cooperative control system [203] in the voltage stabilization operation mode. Additionally, a system configuration of this embodiment is same as that of the example 1 shown by FIGS. 1-3. Components which have the same operation as shown in the Example 1 are represented with the same numbers and so the detailed explanation of those components is skipped here. Differences between the flowchart shown in FIG. 4 are mainly explained, as follows.

The objective for control in this operation mode is voltage at the power system [5] side of the GT [1]. Therefore, it is checked whether the observed voltage V meets the objective of voltage or not [203_d2].

If the observed voltage of the GT [1] does not meet the objective of voltage, a required active power and a required reactive power are determined under the objective of voltage of the GT [1] with using [MATH 2] which represents a well known relation between voltage variation and power variation in a power system [203_e].

$$\Delta V = (\Delta P \times R) - (\Delta Q \times X) \quad \text{[MATH 2]}$$

In the MATH 2 applied to the embodiment, voltage variation $\Delta V$ at the power system [5] side of the GT [1] is a difference between the objective voltage and the observed voltage V. $\Delta P$ is a difference between the required P and the observed P, and $\Delta Q$ is a difference between the required Q and the observed Q. R and X are equivalent resistance and reactance in the power system [5] in FIG. 1, respectively.

Reference voltage $V^*_{REF}$ for the AVR [401] is set by the cooperative control system [203] so as to bring the voltage output by the generator [4] to the objective of voltage of the GT [1], preferably in consideration of the power factor of the GT [1] [203_f]. The voltage $V_{GEN}$ output by the generator [4] is controlled by an excitation of the generator [4] due to the excitation voltage $E_F$ based on the excitation voltage output by the AVR [401] and the $V^*_{REF}$. Consequently, the generator [4] outputs the $P_{GEN}$ and the $Q_{GEN}$ within acceptable range in capability of the generator [4] near the required P and Q under the objective of voltage.

The active power $P_{MAS}$ and the reactive power $Q_{MAS}$ of the frequency converter [201] in the motor drive system [204] at the power system [5] side are adjusted to reference active power $P^*_{MAS}$ and reference reactive power $Q^*_{MAS}$ respectively [203_g]. The reference active power $P^*_{MAS}$ and the reference reactive power $Q^*_{MAS}$ are calculated by the cooperative control system [203] under the objective of voltage, preferably in consideration of the power factor of the MAS [2].

With this example 2, the gas turbine power generation system can contribute the voltage stability improvement in power system.

EXAMPLE 3

Figure 6:
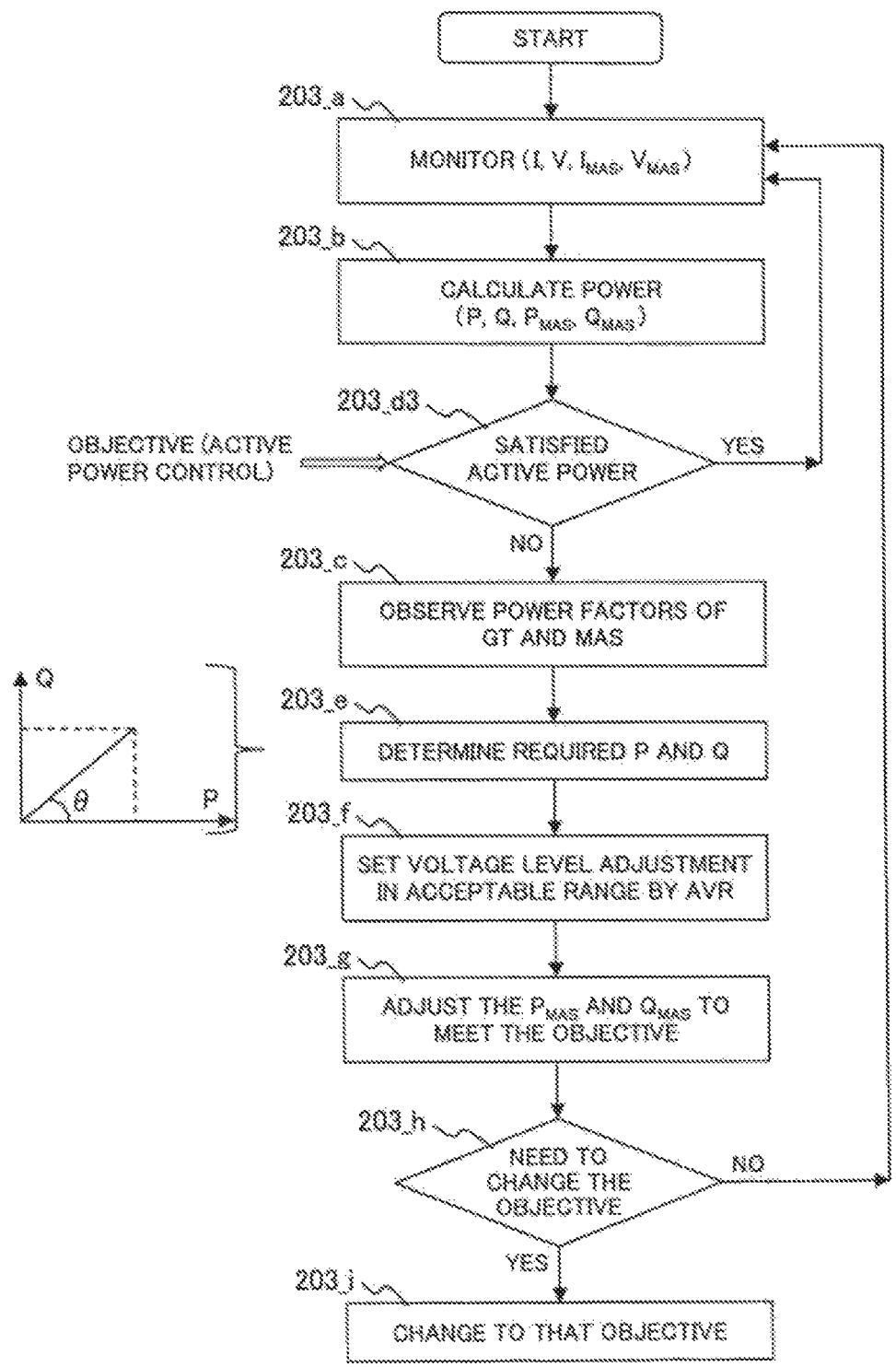
FIG. 6 illustrates a flowchart showing processes of the cooperative control system [203] in a frequency stabilization operation mode.

A frequency stabilization operation mode in the gas turbine power generation system [1] is explained with FIG. 6. This operation mode stabilizes frequency fluctuation that happens in a power system when generation and consumption of active power in the power system is imbalanced.

FIG. 6 illustrates a flowchart showing processes of the cooperative control system [203] in the frequency stabilization operation mode. Additionally, a system configuration of this embodiment is same as that of the example 1 shown by FIGS. 1-3. Components which have the same operation as shown in the Example 1, 2 are represented with the same numbers and so the detailed explanation of those components is skipped here. Differences between the flowcharts shown in FIGS. 4 and 5 are mainly explained, as follows.

The objective for control in this operation mode is active power at the power system [5] side of the GT [1]. Therefore, it is checked whether the observed active power P meets the objective of active power or not [203_d3].

If the observed active power P of the GT does not meet the objective of active power, a required active power and a required reactive power are determined under the objective of active power [203_e].

Reference voltage $V^*_{REF}$ for the AVR [401] is set by the cooperative control system [203] to the objective of active power of the GT [1], preferably in consideration of the power factors of the GT [1] [203_f]. The active power from the generator [4] $P_{GEN}$ is brought to the required active power, which is equal to the objective of active power by the excitation voltage $E_F$ based on the excitation voltage output by the AVR [401] and $V^*_{REF}$. Consequently, the generator [4] outputs the $P_{GEN}$ and the $Q_{GEN}$ within acceptable range in capability of the generator [4] near the required P and Q under the objective of power factor.

The active power $P_{MAS}$ and the reactive power $Q_{MAS}$ of the frequency converter [201] in the motor drive system [204] at the power system [5] side are adjusted to reference active power $P^*_{MAS}$ and reference reactive power $Q^*_{MAS}$ respectively [203_g]. The reference active power $P^*_{MAS}$ and the reference reactive power $Q^*_{MAS}$ are calculated by the cooperative control system [203] under the objective of active power, preferably in consideration of the power factor of the MAS [2].

According to this embodiment, the active power is adjusted fast by the MAS. Consequently, frequency fluctuation in a power system is stabilized fast due to a well known relation between frequency fluctuation $\Delta f$ and active power fluctuation AP in a power system. This relation is represented by [MATH 3].

$$\Delta f = (\Delta P \times K) \quad \text{[MATH 3]}$$

In the [MATH 3] applied to the example 3, $\Delta P$ is a difference between the objective of active power and the observed active power, and K is a coefficient which is the so called "droop". Moreover, $\Delta f$ shows the frequency fluctuation suppressed with adjusting the active power.

With this example 3, the gas turbine power generation system can contribute the frequency stability improvement in power system.

It is to be understood that the invention is not limited in its application to the details of construction and arrangement of parts illustrated in the accompanying drawings, since the invention id capable of other embodiments and of being practiced or carried out in various ways. Also it is to be understood that the phraseology or terminology employed herein is for the purpose of description and not of limitation.

REFERENCE SIGNS LIST 1 gas turbine power generation system (GT)
2 Motor-assisted system (MAS)
3 Dual-shaft gas turbine
4 Generator
5 Power system
201 Frequency converter
202 Rotary electric machine
203 Cooperative control system
204 Motor-drive system
205 Voltage sensor
206 Current sensor
211 Rotating shaft
301 Compressor
302 Burner
303 High pressure turbine
304 Low pressure turbine
311 rotating shaft
312 rotating shaft
401 Automatic voltage regulator (AVR)
412 Rotating shaft
2010 Power conversion circuit
2011 Power conversion circuit
2012 DC link circuit
2013 Smoothing capacitor

The invention claimed is:

1. A gas turbine power generation system comprising:
a dual-shaft gas turbine;
an electric generator mechanically connected to a low pressure turbine of the dual-shaft gas turbine and electrically connected to a n electric power system;
a rotary electric machine mechanically connected to a high pressure turbine through a compressor of the dual-shaft gas turbine and electrically connected to the electric power system; and
an automatic voltage regulator for excitation of the electric generator; wherein
an electric power output from the electric generator side to the electric power system is adjusted by operation of the rotary electric machine as a motor or as a generator; and
the operation of the rotary electric machine adjusts the electric power output from the electric generator side corresponding to a difference between required power and the electric power controlled by the excitation.

2. A gas turbine power generation system according to claim 1 wherein the operation of the rotary electric machine adjusts active power and reactive power.

3. A gas turbine power generation system according to claim 1 wherein the frequency converter is operated by semiconductor switching devices.

4. A gas turbine power generation system according to claim 1 further comprising:
a frequency converter electrically connected between the rotary electric machine and the electric power system, wherein the rotary electric machine is operated by the frequency converter.

5. A gas turbine power generation system according to claim 4 further comprising:
a control system that makes a reference voltage for the excitation and that controls the frequency converter so as to operate the rotary electric machine to adjust the electric power output from the electric generator side corresponding to the difference between required power and the electric power controlled by the excitation, on the basis of an objective.

6. A gas turbine power generation system according to claim 5 wherein the control system controls reactive power of the electric generator and active power and reactive power of the frequency converter.

7. A gas turbine power generation system according to claim 5 wherein the control system controls active power of the electric generator and active power and reactive power of the frequency converter.

8. A gas turbine power generation system according to claim 5 wherein the objective is a power factor at the power electric system side.

9. A gas turbine power generation system according to claim 8 wherein the control system has the objective to achieve constant power factor operation.

10. A gas turbine power generation system according to claim 5 wherein the objective is voltage at the power electric system side.

11. A gas turbine power generation system according to claim 10 wherein the control system has the objective to achieve voltage stabilized operation.

12. A gas turbine power generation system according to claim 5 wherein the objective is active power at the power electric system side.

13. A gas turbine power generation system according to claim 12 wherein the control system has the objective to achieve frequency stabilized operation.

* * * * *